R. HARDESTY.
PERCOLATOR.
APPLICATION FILED FEB. 3, 1915.
1,198,541. Patented Sept. 19, 1916.
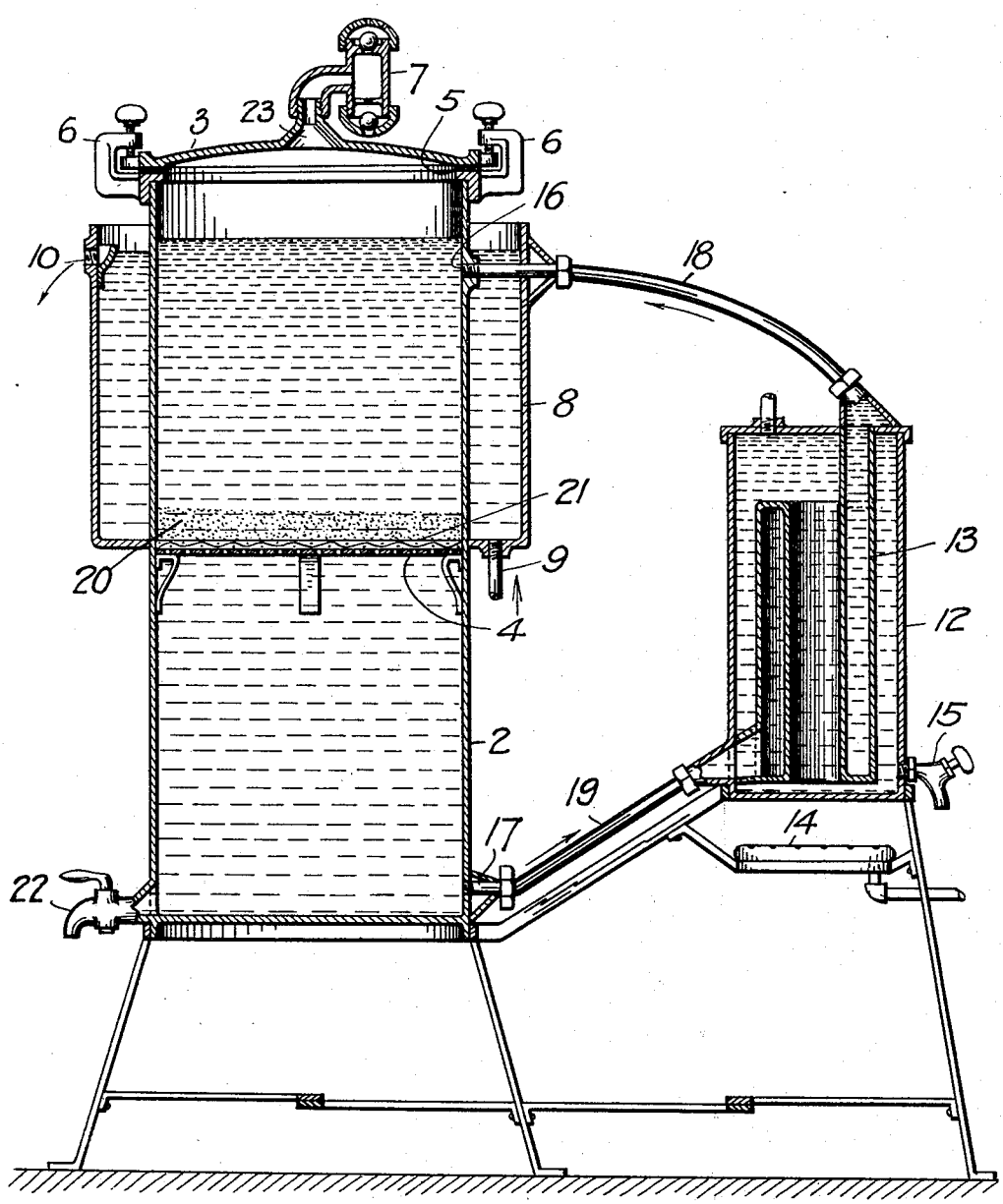
WITNESSES:
F. H. Cuno
L. Rhoades
INVENTOR.
RUDD HARDESTY.
BY
ATTORNEY.

UNITED STATES PATENT OFFICE.

RUDD HARDESTY, OF DENVER, COLORADO.

PERCOLATOR.

1,198,541.   Specification of Letters Patent.   Patented Sept. 19, 1916.

Application filed February 3, 1915. Serial No. 5,860.

*To all whom it may concern:*

Be it known that I, RUDD HARDESTY, a citizen of the United States, residing at Denver, in the county of Denver and State of Colorado, have invented certain new and useful Improvements in Percolators, of which the following is a specification.

My invention relates to improvements in percolators used in the production of extracts and tinctures of herbs, roots, beans and other vegetable matter, and its object resides in providing an apparatus of simple construction which in its operation compels a liquid solvent to pass at a constant velocity and a uniform temperature through the vegetable material from which the extract is to be obtained.

With this object in view my invention consists of a vessel in which the material under treatment is disposed, a means for heating a liquid solvent after it has passed through the material, to a uniform temperature sufficient to cause its return into the vessel and to effect the dissolution of the resinous mattter in the material, a means for cooling the heated solvent after it has been returned into the vessel, to increase its specific gravity and thereby accelerate its movement through the material, and means for maintaining air contained in the vessel at a uniform pressure whereby to eliminate its retarding influence on the circulatory movement of the liquid solvent.

In the construction of the heating means, care has been taken to avoid possible overheating of the solvent which in a percolator of the character of the present invention, would result in deterioration of the flavor of the extract by dissolution of undesirable parts of the vegetable matter, or which in case an alcoholic solvent is used, would cause it to evaporate in part and thus change the percentage of alcohol in the solvent.

The different conduits comprised in the apparatus are formed to reduce to the minimum, their frictional resistance to the circulatory movement of the solvent liquid.

In the accompanying drawing which represents a sectional elevation of my improved percolator, the reference numeral 2 designates a vessel normally closed by means of a cover 3, and divided into two compartments by a horizontal, foraminous partition 4 upon which in practice, the material under treatment is supported.

An air-tight connection between the edge of the vessel at its upper end and the cover is effected by an interposed rubber gasket 5 and a plurality of clamps 6 which firmly secure the cover in place on the vessel.

The cover is provided with an air opening 23 the flow through which in either direction is controlled by a valve 7 which is constructed to permit of the escape of air in case of its compression beyond a predetermined degree, and to cause an inflow of atmosphere when the density of the air within the vessel is decreased to a point below the said determinate degree.

The compartment of the vessel above its foraminous partition is surrounded by an open jacket 8 into which a cooling fluid is introduced through a pipe 9 and which has an overflow 10 for the discharge of the fluid after it has performed its function.

The heating element of the apparatus consists of an upright cylindrical container 12, an annular cylindrical flue 13 spaced from the interior surface thereof, and a burner 14 placed below the container to heat the liquid contents of the same.

The container which is positioned at a point substantially midway between the horizontal planes of the upper and lower ends of the vessel has an inlet for water and a tap 15 for the discharge of the same, and the annular flue is at its upper and lower extremities, connected with an ingress opening 16 and an egress opening 17 at the corresponding ends of the vessel 2, by means of pipes 18 and 19.

In the operation of the percolator, a mass 20 of vegetable matter from which the extract is to be obtained is in a finely divided condition, deposited upon the foraminous partition which if necessary may be covered with a sheet of cloth 21 or other porous medium to strain the finer solid particles from the liquid.

The vessel is filled with the solvent to a point above its ingress opening 16 and the container 12 of the heating element is filled with water which is heated by means of the burner 14.

The heat of the water in the container is communicated to the solvent within the annular flue 13, which in consequence rises in the pipe 18 that conducts it into the upper compartment of the vessel. At this point the liquid is rapidly cooled by the influence of cold water circulating through the jacket 8, and by its consequently increased specific gravity, is compelled to pass through the mass of vegetable material deposited upon the partition 4.

By regulating the degree of heat communicated to the solvent by the heating element and the degree to which it is subsequently cooled after it has entered the vessel, the solvent is compelled to pass through the material under treatment at a constant velocity and at a uniform temperature best adapted for the production of an extract free from foreign flavors.

The extract produced in the operation of the apparatus collects in the lower compartment of the vessel from which it may be drawn through a tap 22. It will be observed that every part of the apparatus is designed to promote the circulatory movement of the solvent at a constant velocity.

The pipes and their connections with the upright flue have been formed to eliminate as much as is possible, frictional resistance to the flow of the solvent and the valve on the cover permits the escape of air when its compression would oppose the inflow of solvent into the vessel or to admit air in case the formation of a partial vacuum should retard the downward movement of the liquid in the vessel through the material disposed upon its foraminous partition.

The position of the heater midway between the horizontal planes of the ingress and egress openings of the vessel is also conducive to promote the uniform movement of the solvent in the desired direction. It will be readily understood that heating of the solvent through the medium of a liquid is of importance as it completely prevents raising of the temperature of the liquid to a point of volatilization of its spirituous constituents and insures the return of the solvent into the vessel at a uniform temperature.

Having thus described my invention what I claim and desire to secure by Letters-Patent is:

A device of the type described including a vessel having a foraminous partition intermediate the ends thereof and having an annular chamber surrounding that portion of said vessel above the plane of the partition, said annular chamber having ingress and egress ports, a second vessel arranged exteriorly of the first named vessel and having its top and bottom respectively below and above the planes of the top and bottom of the first named vessel, said second named vessel having an annular flue therein, pipes connecting the top and bottom of the annular flue respectively with the top and bottom of the first named vessel, said flue being arranged for heating by hot water contained in the second named vessel and means for heating water in the second named vessel.

In testimony whereof I have affixed my signature in presence of two witnesses.

RUDD HARDESTY.

Witnesses:
  ALICE ANDREWS,
  A. F. ALBERS.

Copies of this patent may be obtained for five cents each, by addressing the "Commissioner of Patents, Washington, D. C."